United States Patent
Chinello et al.

(10) Patent No.: US 9,375,898 B2
(45) Date of Patent: Jun. 28, 2016

(54) MATERIAL COMPOSED OF SUPERIMPOSED LAYERS WHICH ARE MUTUALLY ANCHORED AND SEPARABLE, PARTICULARLY FOR MANUFACTURING, ON AUTOMATED LINES, PACKAGES, BAGS, ENVELOPES, CONTAINERS OR THE LIKE

(71) Applicant: LINEAPACK S.R.L., Carmignano di Brenta (PD) (IT)

(72) Inventors: Damiano Chinello, Carmignano di Brenta (IT); Michele Chinello, Carmignano di Brenta (IT); Pierluigi Chinello, Carmignano (IT); Tiziano Chinello, Carmignano di Brenta (IT)

(73) Assignee: LINEAPACK CHINELLO, S.R.L., Carmignano di Brenta (PD) (IT)

( * ) Notice: Subject to any disclaimer, the term of this patent is extended or adjusted under 35 U.S.C. 154(b) by 0 days.

(21) Appl. No.: 13/832,877

(22) Filed: Mar. 15, 2013

(65) Prior Publication Data

US 2014/0272234 A1    Sep. 18, 2014

(51) Int. Cl.
 *B32B 7/14* (2006.01)
 *B32B 7/06* (2006.01)
 *B32B 23/08* (2006.01)

(52) U.S. Cl.
 CPC ... *B32B 7/14* (2013.01); *B32B 7/06* (2013.01); *B32B 23/08* (2013.01); *B32B 2553/00* (2013.01); *Y10T 428/14* (2015.01)

(58) Field of Classification Search
 CPC ............. B42D 5/002; B42F 5/00; G09F 3/10; B31D 1/021; C09J 7/02; C09J 7/04; C09J 2201/122; C09J 2201/16; C09J 2201/28; C09J 2203/338; C09J 2401/005; C09J 2401/006; Y10T 428/14; Y10T 428/1486; Y10T 428/149; Y10T 428/1495; D21H 27/10; D21H 27/36; B32B 7/14; B32B 7/06; B32B 23/08; B32B 2553/00; B65D 75/00; B65D 2565/00
 USPC .......................... 428/40.1, 41.7, 41.8, 42.1, 43
 See application file for complete search history.

(56) References Cited

U.S. PATENT DOCUMENTS 2,264,628 A * 12/1941 Engert et al. ................. 156/250
2,292,024 A *  8/1942 Dreher ......................... 428/317.3
(Continued)

FOREIGN PATENT DOCUMENTS

| EP | 2535179 A1 | 12/2012 |
|---|---|---|
| GB | 2093403 A | 9/1982 |
| WO | 01/36188 A1 | 5/2001 |

OTHER PUBLICATIONS

European Search Report in EP application No. 12171959.5-2124 dated Sep. 4, 2012.
Italian Search report re. Italian application MI2011A001075, corresponding to EP application No. 12171959.5, published as EP 2535179A1.

*Primary Examiner* — Patricia L Nordmeyer
(74) *Attorney, Agent, or Firm* — Kristina Castellano; Castellano PLLC

(57) ABSTRACT

A material includes superimposed layers which are mutually anchored and separable, particularly for manufacturing, on automated lines, packages, bags, envelopes, containers or the like. The material according to the invention comprises at least one first layer made of cellulose material and at least one second layer made of synthetic material. The first layer and the second layer are connected to each other by an adhesive which is interposed between the two layers and is arranged in mutually spaced adhesive bonding regions.

17 Claims, 4 Drawing Sheets

(56) References Cited

U.S. PATENT DOCUMENTS 7,485,360 B2 2/2009 Barnes et al.
2003/0148110 A1 8/2003 Holbert
2005/0084641 A1* 4/2005 Downs et al. ............... 428/42.3

* cited by examiner

MATERIAL COMPOSED OF SUPERIMPOSED LAYERS WHICH ARE MUTUALLY ANCHORED AND SEPARABLE, PARTICULARLY FOR MANUFACTURING, ON AUTOMATED LINES, PACKAGES, BAGS, ENVELOPES, CONTAINERS OR THE LIKE

FIELD

The present invention relates to a material composed of superimposed layers which are mutually anchored and separable, particularly for manufacturing, on automated lines, packages, bags, envelopes, containers or the like.

BACKGROUND

In the field of the packaging of products, particularly food products, materials are known which are composed of superimposed layers which are mutually connected in order to meet the need to protect and/or preserve the products and the need to achieve an aesthetically valid presentation of the packaged product.

Such materials are generally composed of at least one layer made of cellulose material, such as paper or the like, which is intended to constitute the visible layer of the package, and at least one layer made of synthetic material, which is intended to make contact with the product. The cellulose layer makes it possible to obtain a natural visual and tactile presentation, which is highly appreciated in the food sector, while the synthetic layer or layers adequately isolate the product from the outside environment, preserving it against contaminations and avoiding its outward release.

Moreover, the cellulose layer can be printed with the most disparate techniques in order to achieve an adequate presentation of the product and provide useful information to the customer.

The field of food product packaging uses compound materials in which the layer or layers made of synthetic material are stably anchored to the cellulose layer such that the two layers are integral therebetween. Such compound materials have the advantage that they can be used without problems in automated production lines for packages, bags, envelopes, containers or the like, since the various layers of the compound material remain tightly coupled to each other during the traction of the material along the line even in the presence of intense stresses. On the other hand, these compound materials have problems that are not easy to solve when they must be disposed, if a separate disposal of the cellulose layer with respect to the synthetic layer or layers is required. These materials can be disposed separately only by means of complicated and expensive systems which very often are not economically convenient. For this reason, compound materials of this kind are generally disposed in a non-separated manner by sending them to landfills or incinerators.

Substantially, the materials composed of superimposed layers that are currently used, particularly in the field of packaging food products, are unable to combine in a fully satisfactory way the need to have an adhesion between the layers that compose them that is sufficient to allow their use without problems in automated lines for the production of packages, bags, envelopes, containers or the like with the need to be able to perform in a simple manner a separate disposal of the layers that compose them.

SUMMARY

The aim of the present invention is to solve the above mentioned problems, by providing a material including superimposed layers which are mutually anchored and separable, which makes it possible to dispose, in a manner that is differentiated according to their type, the layers that compose it and can be used without problems in automated lines for the production of packages, bags, envelopes, containers or the like.

Within this aim, an object of the invention is to provide a material composed of superimposed layers in which the layers that compose it are joined with a cohesion that is sufficient to withstand, without separating, the stresses caused by automatic processes but makes it possible to separate said layers easily by simple manual pulling.

Another object of the invention is to provide a material composed of superimposed layers in which the layers to be disposed separately can be separated without having to resort to particular techniques and/or systems having high purchase and management costs.

A further object of the invention is to provide a material that offers adequate assurances of protection for the packaged products and can be printed with the most disparate methods currently in use to obtain a fully satisfactory presentation of the packaged product.

Another object of the invention is to provide a material that can be manufactured simply with commonly available equipment and systems.

Another object of the invention is to provide a material that can be manufactured with highly competitive costs.

This aim and these and other objects, which will become better apparent hereinafter, are achieved by a material composed of superimposed layers which are mutually anchored and separable, particularly for manufacturing, on automated lines, packages, bags, envelopes, containers or the like, comprising at least one first layer made of cellulose material and at least one second layer made of synthetic material, wherein the first layer and second layer are connected to each other by means of an adhesive which is interposed between said two layers and is arranged in mutually spaced adhesive bonding regions.

BRIEF DESCRIPTION OF THE DRAWINGS

Further characteristics and advantages of the invention will become better apparent from the description of two preferred but not exclusive embodiments of the material according to the invention, illustrated by way of non-limiting example in the accompanying drawings, wherein.

DETAILED DESCRIPTION

Figure 1:
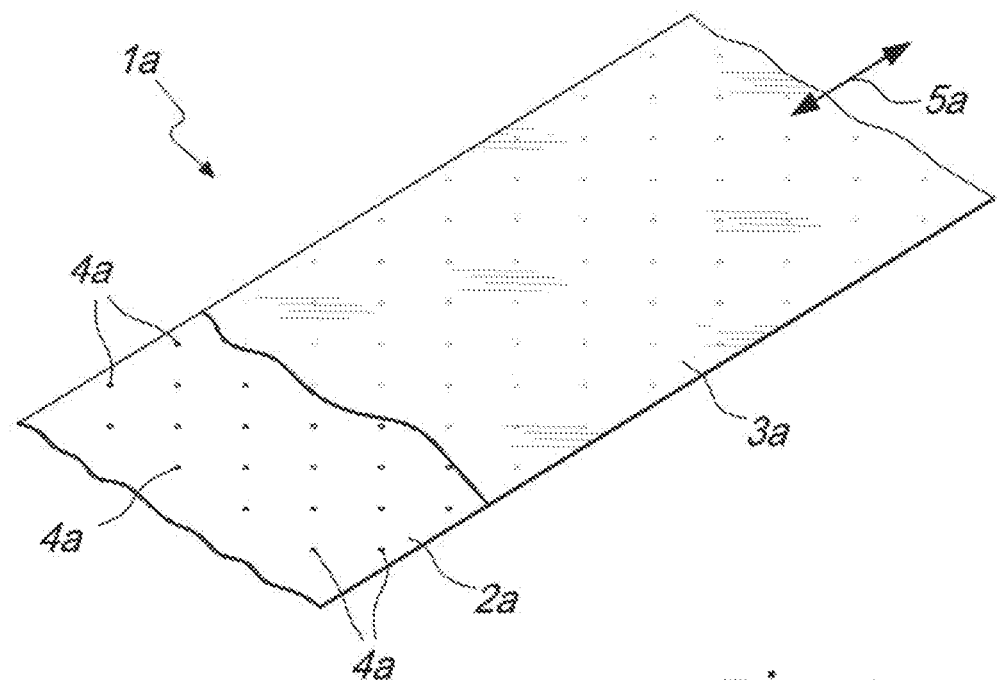
FIG. 1 is a view of a portion of material according to the invention in the first embodiment.
Figure 2:
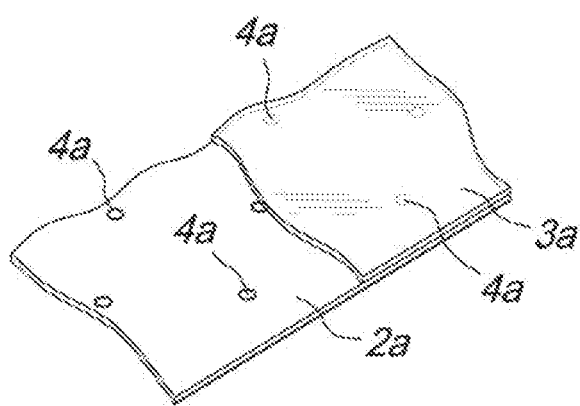
FIG. 2 is an enlarged-scale view of a detail of the portion of material shown in FIG. 1.

With reference to the figures, the material according to the invention, generally designated by the reference numerals 1a, 1b in the two embodiments, comprises at least one first layer 2a, 2b made of cellulose material and at least one second layer 3a, 3b made of synthetic material.

The first layer 2a, 2b made of cellulose material and the second layer 3a, 3b made of synthetic material are conveniently planar.

According to the invention, the first layer 2a, 2b and the second layer 3a, 3b are connected to each other by means of an adhesive which is interposed between the layers 2a, 3a, 2b, 3b and is arranged in mutually spaced adhesive bonding regions 4a, 4b.

The adhesive bonding regions 4a, 4b provide an adhesive force so as to allow a mutual separation of the first layer 2a, 2b and said second layer 3a, 3b by a manual action.

Therefore, the user when the material of the invention has been used, e.g. when a package formed using the material of the invention is empty, grasps one edge of the material of the invention and applies a suitable force for separating the first layer 2a, 2b and second layer 3a, 3b.

The skilled man will choose the suitable adhesive and/or the suitable configuration of the bonding regions, and/or position of the latters on the material in order to obtain a suitable adhesive force for the material of the invention.

The adhesive bonding regions 4a, 4b are so configured as to keep the first layer 2a, 2b and the second layer 3a, 3b mutually joined during the working of the material, during the handling operations and during the use of an object produced with the material of the invention.

The adhesive bonding regions 4a, 4b are, on the other side, so configured as to allow the first layer 2a, 2b and the second layer 3a, 3b to be mutually separated by a manual action.

Moreover, the adhesive bonding regions 4a, 4b are configured so that when a user of the material of the invention separates the first layer 2a, 2b and the second layer 3a, 3b the layers do not tear but remain intact during the mutual separation.

Figure 3:
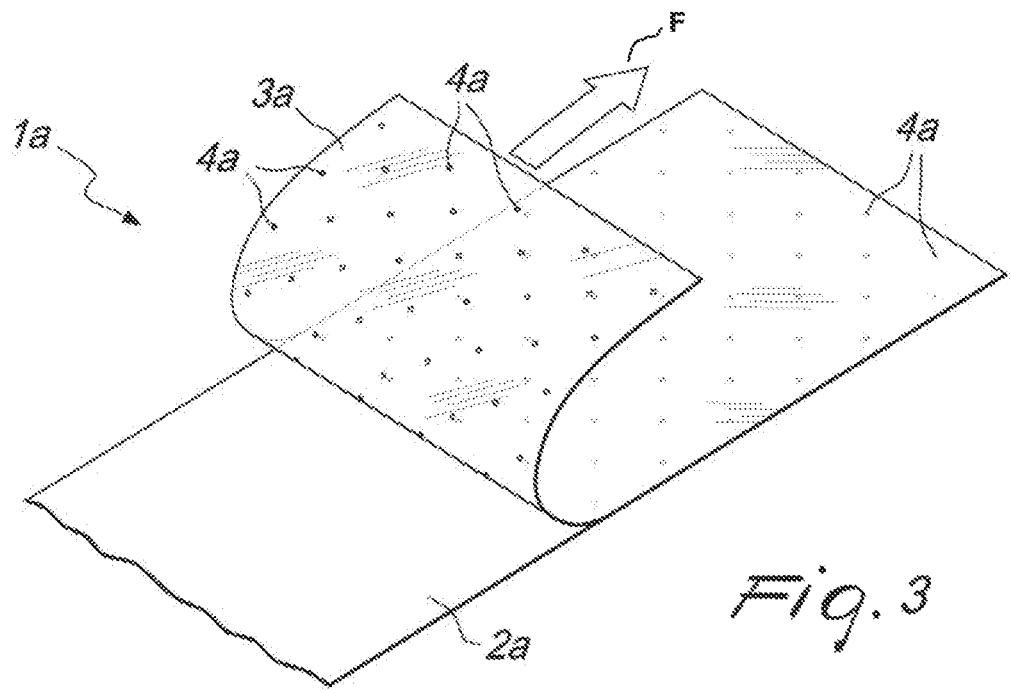
FIG. 3 is a view of the portion of material of the preceding figures during the separation of the layer of cellulose material from the layer or layers of synthetic material.
Figure 4:
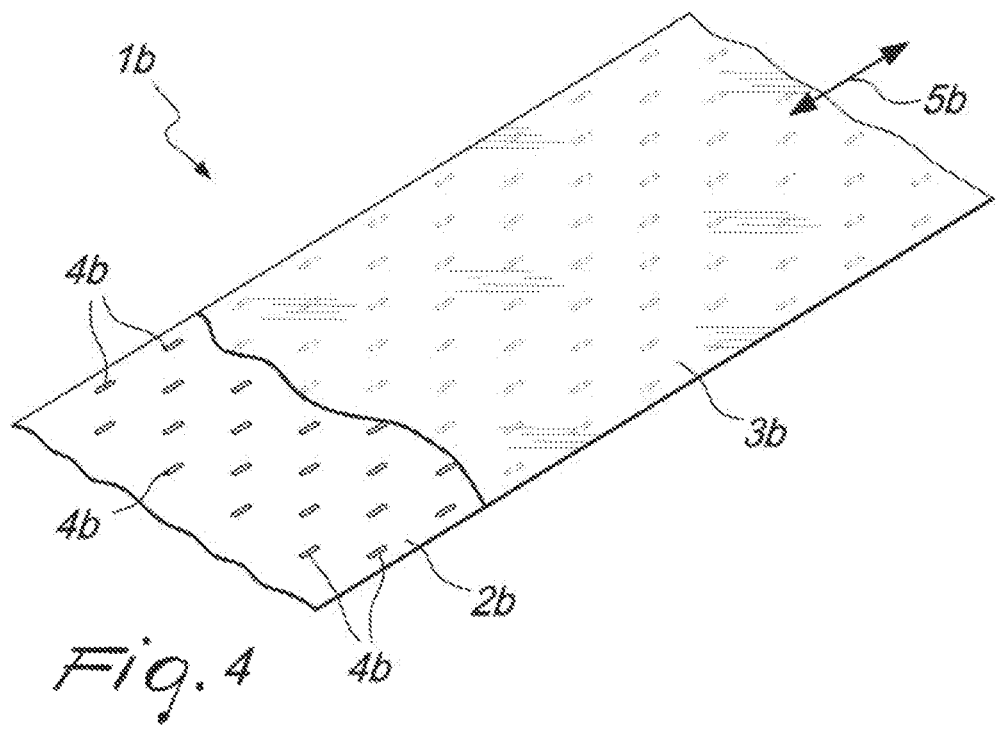
FIG. 4 is a view of a portion of material according to the invention in the second embodiment.
Figure 5:
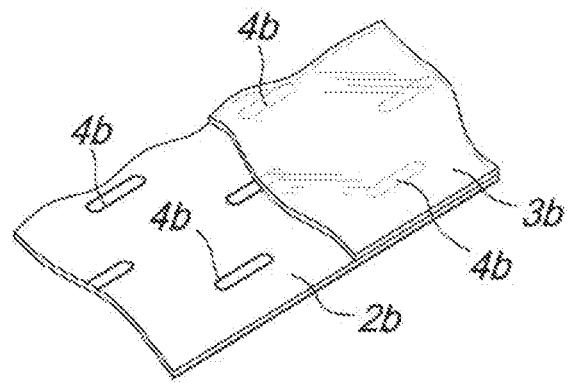
FIG. 5 is an enlarged-scale view of a detail of the portion of material shown in FIG. 4.
Figure 6:
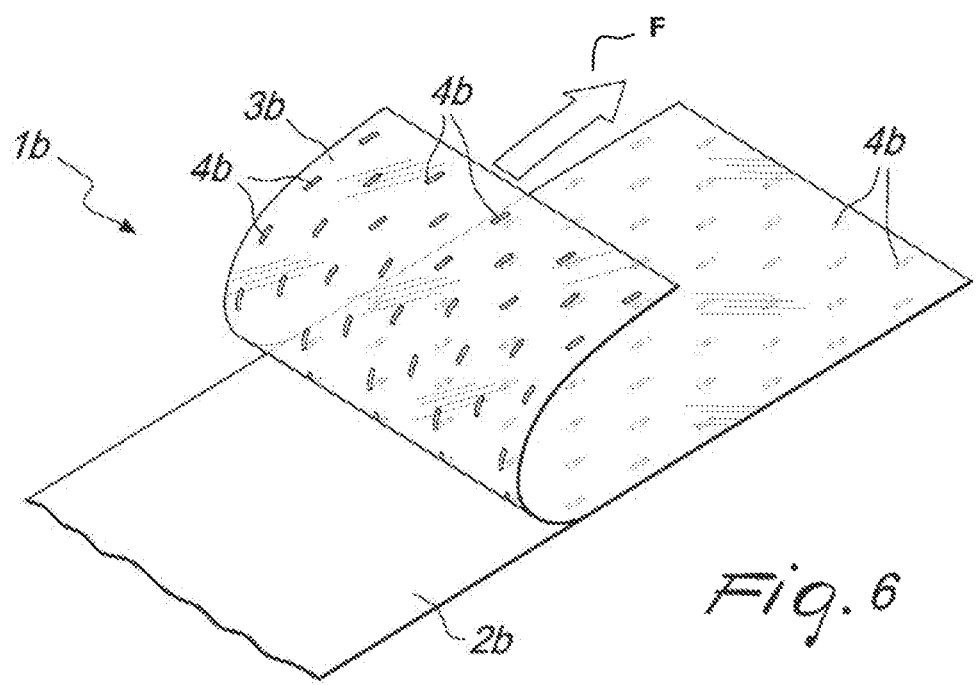
FIG. 6 is a view of the portion of material of FIGS. 4 and 5 during the separation of the layer of cellulose material from the layer or layers of synthetic material.

This implies that the separation may be effected in one step only, by grasping a suitable edge portion of the material and applying a suitable manual force in the direction indicated by the arrow "F" in FIGS. 3 and 6 in order to mutually separate the first layer 2a, 2b and the second layer 3a, 3b. The first layer 2a, 2b, designed to define the outer face of the package or bag or packaging or envelope or the like, can be constituted by paper which can be printed with the most disparate methods currently used to obtain the desired aesthetic effects of product presentation and to provide the necessary information to the consumer regarding the packaged product.

The second layer 3a, 3b is preferably made of a material that is substantially impermeable to liquids.

The second layer 3a, 3b can be constituted by one or more planar superimposed layers of PE-HD (high molecular density polyethylene) or by other synthetic materials, particularly synthetic materials suitable for the packaging of food products such as for example PET (polyester), nylon, PP (coextruded or cast polypropylene), polyethylene-ethylene vinyl alcohol-polyethylene (polyethylene+resin+polyethylene), PLA (polylactic acetate), PELD, et cetera.

The material of the first layer 2a, 2b and of the second layer 3a, 3b must be usually thrown away after use in different containers.

Therefore, when the material of the invention has been used, the user separates the first layer 2a, 2b and second layer 3a, 3b and throws away each layer in the suitable container.

As shown in the first embodiment, the adhesive bonding regions 4a, 4b are preferably shaped like spots or, as shown in the second embodiment, like segments.

Conveniently, the material 1a, 1b according to the invention is provided in the form of a continuous ribbon so as to be fed to automated lines for manufacturing packages, bags, envelopes, containers or the like, and the adhesive bonding regions 4a, 4b, are arranged so as to delimit spaces between the layers 2a, 3a and 2b, 3b, which are open at least along directions which are parallel to the advancement direction 5a, 5b along which the material 1a, 1b is moved, in ribbon form, in the automated line.

Preferably, the adhesive bonding regions 4a, 4b are arranged along rows which are oriented at right angles to the longitudinal extension, i.e., to the advancement direction 5a, 5b of the material 1a, 1b in ribbon form and the adhesive bonding regions 4a, 4b of one row are offset with respect to the adhesive bonding regions 4a, 4b of the two contiguous rows, so as to define air evacuation channels, between the layers 2a, 3a, 2b, 3b, which are inclined with respect to the longitudinal extension of the ribbon of material 1a, 1b.

Figure 7:
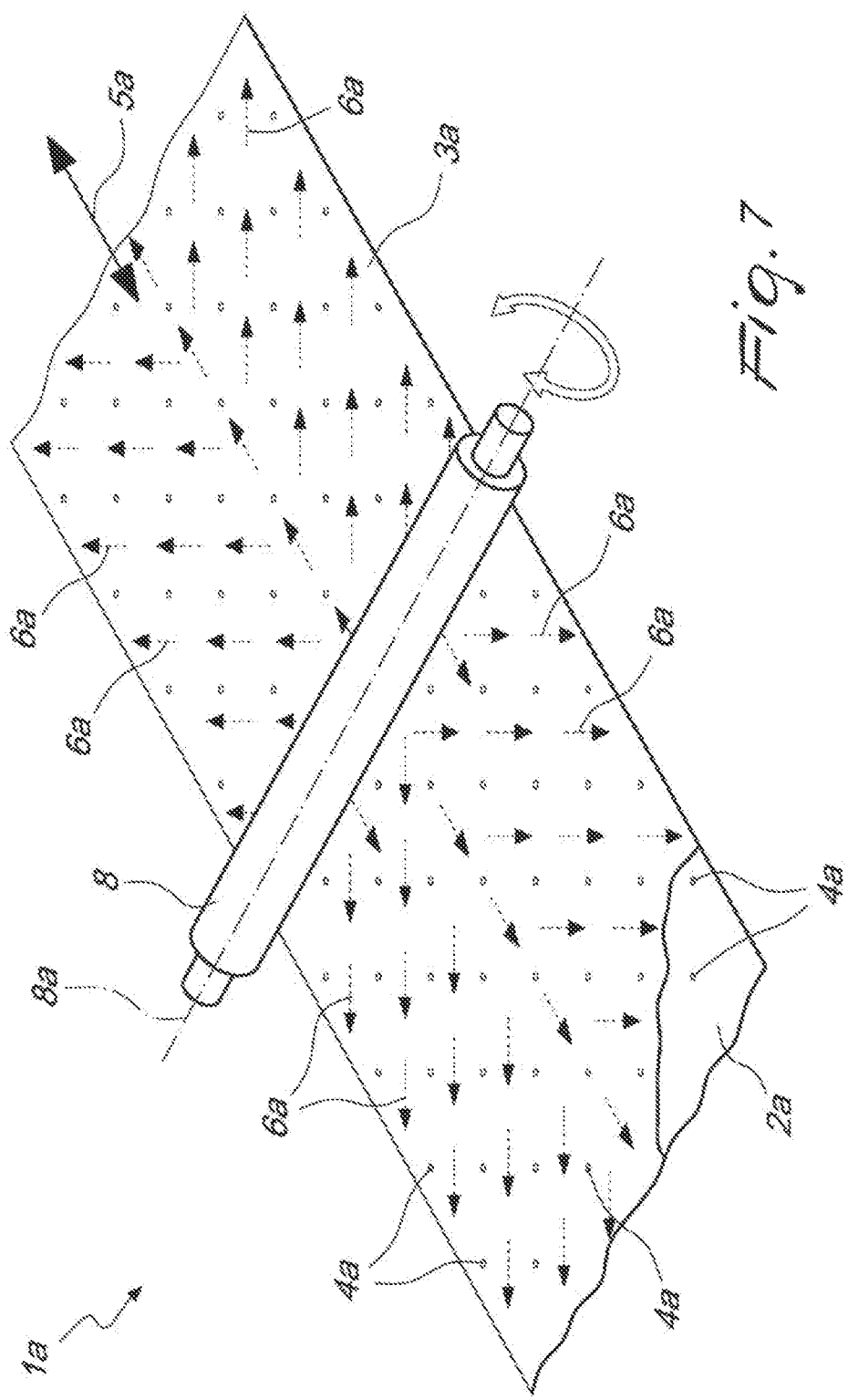
FIG. 7 is a view of the effect of the action of a roller on a portion of material according to the invention in the first embodiment.

The air evacuation channels lead externally at the longitudinal sides of the material 1a, 1b in ribbon form. The effect of this arrangement of the adhesive bonding regions 4a, 4b in facilitating the outflow of the air, 5 indicated by the arrows 6a, is shown by way of example in FIG. 7, which illustrates the action of a roller 8 which is arranged so that its axis 8a is transverse to the longitudinal extension of the material 1a, in the two possible directions of longitudinal advancement of the material 1a. The presence of the air evacuation channels prevents the formation of air bubbles between the first layer 2a, 2b and second layer 3a, 3b, thus avoiding unwanted detachment of the two layers due to the popped air bubbles.

In the illustrated embodiments, in view of the shape and distribution of the adhesive bonding regions 4a, 4b, the spaces delimited by the adhesive bonding regions 4a, 4b are open both along parallel directions and along directions which are inclined with respect to the longitudinal extension of the material 1a, 1b, i.e., to the advancement direction 5a, 5b of the material 1a, 1b along the automated line that it is intended to feed. In this manner, the air contained in the spaces comprised between the layers 2a, 3a, and 2b, 3b joined by the adhesive bonding regions 4a, 4b, by being evacuated easily, has no unwanted effects on the integrity of the material 1a, 1b and causes no problems of advancement of the material 1a, 1b along the line.

The bonding regions 4a, 4b are so positioned as to form air evacuation channels on the material 1a, 1b, the air evacuation channels being inclined by an angle comprised between about 15° and 75° in relation to the advancement direction 5a, 5b of the material during the producing processes.

The configuration of the bonding regions 4a, 4b allows any air bubble formed between the first 2a, 2b and second layer 3a, 3b to be vented out at the lateral edge of the material 1a, 1b.

In a version the bonding regions 4a, 4b are so positioned to form air evacuation channels that are inclined by an angle of about 45° in relation to the advancement direction 5a, 5b. In particular, it should be noted that the material 1a, 1b according to the invention can be subjected without problems to the action of movement or printing rollers which are arranged so that their axis lies transversely to the longitudinal extension of the material 1a, 1b in ribbon form, since the air between the layers 2a, 3a, 2b, 3 b, under the action of the rollers, is evacuated easily through the longitudinal sides of the material 1a, 1b in ribbon form, preventing accumulation between the layers 2a, 3a, 2b, 3b and avoiding alterations or even the bursting with tearing of the material 1a, 1b.

Advantageously, the extension and/or the number of the adhesive bonding regions 4a, 4b per unit surface is directly proportional to the separating strength required for the layers 2a, 3a and 2b, 3b mutually connected by the adhesive bonding regions 4a, 4b.

Preferably, the adhesive bonding regions 4a, 4b are uniformly mutually spaced and even more preferably are arranged at the intersection points of an imaginary grid with uniform meshes. In this manner, a separating strength of the layers 2a, 3a, 2b, 3b is achieved, which is substantially uniform along the extension of the material 1a, 1b according to the invention.

In case of particular packaging requirements, such as for example if the material 1a, 1b is to be used to manufacture packages having a nonsymmetrical structure, which require a cohesion between the layers 2a, 3a, 2b, 3b that is differentiated from one region to another, the distance between the adhesive bonding regions 4a, 4b can vary along the extension of the material 1a, 1b.

The adhesive by means of which the adhesive bonding regions 4a, 4b are provided and which can be applied to the layers 2a, 2b or 3a, 3b according to methods of a known type is constituted preferably by an adhesive of the permanent type, which is compatible with the materials of the layers 2a, 2b, 3a, 3b and is adapted to be used with the products that are to be packaged by means of the material 1a, 1b, such as for example a vinyl-based adhesive.

The skilled man will choose the adhesive to be used and/or the shape and/or the position of the bonding regions 4a, 4b in manner which is dependent on the material intended to be packaged and/or the material of the layers 2a, 2b, 3a, 3b, and/or the adhesive force desired for the material of the invention.

Use of the material 1a, 1b according to the invention is as follows.

The material 1a, 1b has the appearance of a material composed of at least two layers 2a, 3a and 2b, 3b, which are mutually joined at the adhesive bonding regions 4a, 4b.

As such, the material 1a, 1b can be fed to an automated line for manufacturing packages, bags, envelopes, containers or the like. The degree of adhesion between the layers 2a, 3a and 2b, 3b ensured by the adhesive bonding regions 4a, 4b, is such as to exclude assuredly the separation of the layers 2a and 3a, 2b and 3b during operation in the line for manufacturing packages, bags, envelopes, containers or the like. Moreover, as explained above, the automated treatment of the material 1a, 1b does not create problems, since the air that is present between the layers 2a, 3a and 2b, 3b is progressively vented externally without causing alterations or damage of the material 1a, 1b.

It should be noted that the separating strength of the layers 2a, 3a, 2b, 5 3b joined by the adhesive bonding regions 4a, 4b can be changed so as to meet the requirements of the packaging and production of packages, bags, envelopes, containers or the like simply by varying the size or number of the adhesive bonding regions 4a, 4b per unit surface.

At the end of the useful life of the material 1a, 1b according to the invention, the layers 2a, 3a, 2b, 3b mutually joined by the adhesive of the adhesive bonding regions 4a, 4b can be separated simply by means of a manual action, causing the separation of the first layer 2a, 2b from the second layer 3a, 3b and/or from the adhesive of the adhesive bonding regions 4a, 4b.

The two separated layer thus obtained can be separately disposed and in the suitable container provided for this aim.

Mainly, the adhesive of the adhesive bonding regions 4a, 4b remains on the second layer 3a, 3b, retaining a small amount of the cellulose material of the first layer 2a, 2b, which causes no contamination problems in the disposal of the second layer 3a, 3b.

It should be noted that the first layer 2a, 2b can be printed without problems, in a per se known manner, like any sheet of cellulose material to obtain the desired presentation of the product to be packaged. The same characteristics that make the material 1a, 1b according to the invention suitable for treatment with automatic packaging lines make it equally suitable to be printed on any system of any type of existing rotary printing.

In practice it has been found that the material composed of superimposed layers according to the invention fully achieves the intended aim, since it can be used without problems on automated lines for the production of packages, bags, envelopes, containers or the like and after use can be easily separated in order to be disposed separately.

Another advantage of the material according to the invention is that it makes it possible to reduce by over 50% the amount of adhesive required to achieve cohesion between the layers that compose it and allows the use of water-based adhesives, which in larger quantities would wet the layer of cellulose material excessively.

A further advantage of the material according to the invention is that it allows the outflow of the air that penetrates between the layers that compose it, avoiding, during the treatments and due to the sliding on rollers or forming plates, the forming of bubbles or pockets of air which, if not evacuated easily and rapidly, would break the adhesive bonding regions, with consequent impossibility to treat the material in an automated manner.

Although the material according to the invention has been conceived in particular for the packaging of food products, it can also be used for the packaging of other products.

Using the material of the invention, it is possible to obtain a novel package, that can be used for packing various kind of products, for example food products and that, after use, can be correctly disposed. When the package has been used, the user will separate the first layer 2a, 2b and the second layer 3a, 3b and will then throw away each layer in the suitable container.

The material of the invention can also be used for obtaining a bag, or an envelope. The material according to the invention thus conceived is susceptible of numerous modifications and variations, all of which are within the scope of the appended claims. All the details may further be replaced with other technically equivalent elements.

In practice, the materials used, except for what has been specified otherwise above, as well as the contingent shapes and dimensions, may be any according to requirements and to the state of the art.

The invention claimed is:

1. A packaging material comprising superimposed layers which are mutually anchored and separable, comprising at least one first layer made of cellulose material and at least one second layer made of synthetic material, wherein said synthetic material comprises at least one material selected from the group consisting of polyester, nylon, polypropylene, polyethylene+resin+polyethylene, polylactic acetate, and low density polyethylene, said first layer and said second layer being connected to each other by a permanent adhesive which is interposed between said first layer and said second layer, wherein said adhesive directly contacts said first layer and said second layer, and is arranged in mutually spaced adhesive bonding regions said adhesive bonding regions providing an adhesive force so as to allow a mutual separation of the first layer and said second layer by a manual action; wherein said adhesive bonding regions are so configured that said adhesive remains on the second layer when the first layer and the second layer are mutually separated.

2. The material according to claim 1, wherein said adhesive bonding regions are spot shaped.

3. The material according to claim 1, wherein said adhesive bonding regions are segment shaped.

4. The material according to claim 1, wherein the material is provided in the form of a ribbon intended to be moved along an advancement direction which is parallel to a longitudinal extension of the material, said adhesive bonding regions delimiting spaces between said at least two layers and said spaces being open at least along directions which are parallel to said advancement direction.

5. The material according to claim 1, wherein said adhesive bonding regions are arranged along rows which are oriented at right angles to a longitudinal extension of the material in ribbon form, the adhesive bonding regions of one row being offset with respect to the adhesive bonding regions of the two contiguous rows in order to define air evacuation channels between said layers, which are inclined with respect to the longitudinal extension of the material in ribbon form and lead externally at the longitudinal sides of the material in ribbon form.

6. The material according to claim 5, wherein the air evacuation channels has a longitudinal extension forming an angle comprised between 15° and 75° with an advancement direction of the material.

7. The material according to claim 6, wherein the air evacuation channels form an angle of 45° with the advancement direction of the material.

8. The material according to claim 1, wherein the extension and/or number of said adhesive bonding regions per unit surface is directly proportional to the separating strength required for said at least two layers.

9. The material according to claim 1, wherein said adhesive bonding regions are regularly mutually spaced.

10. The material according to claim 1, wherein the distance between said adhesive bonding regions varies along the extension of the material.

11. The material according to claim 1, wherein said adhesive bonding regions are arranged at the intersection points of an imaginary grid with uniform meshes.

12. The material of claim 1, wherein said material is suitable for manufacturing, on automated lines, at least one of packages, bags, envelopes, and containers.

13. A package comprising a material according to claim 1.

14. A package for food products formed using a material according to claim 1.

15. The material according to claim 1, wherein the material is a flexible material.

16. The material according to claim 1, wherein the adhesive is a vinyl based adhesive.

17. The packaging material of claim 1, wherein the synthetic material is selected from the group consisting of polyethylene terephthalate and polyethylene-ethylene vinyl alcohol-polyethylene.

\* \* \* \* \*